United States Patent
Kim et al.

(10) Patent No.: US 7,623,742 B2
(45) Date of Patent: Nov. 24, 2009

(54) METHOD FOR PROCESSING DOCUMENT IMAGE CAPTURED BY CAMERA

(75) Inventors: Yu Nam Kim, Seoul (KR); Sang Wook Park, Gimpo-si (KR); Sung Hyun Kim, Yongin-si (KR); Seong Chan Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 11/216,331

(22) Filed: Aug. 30, 2005

(65) Prior Publication Data

US 2006/0045342 A1    Mar. 2, 2006

(30) Foreign Application Priority Data

Aug. 31, 2004 (KR) ............... 10-2004-0069320
Sep. 2, 2004  (KR) ............... 10-2004-0069844

(51) Int. Cl.
G06K 9/20 (2006.01)

(52) U.S. Cl. .................. 382/321; 382/182; 382/316; 455/550.1

(58) Field of Classification Search ............ 235/454; 348/333.12; 382/321, 182, 316; 455/414.1, 455/556.1

See application file for complete search history.

(56) References Cited

U.S. PATENT DOCUMENTS

| | | | |
|---|---|---|---|
| 5,321,770 A | 6/1994 | Huttenlocher et al. | |
| 5,546,479 A | 8/1996 | Kawanaka et al. | |
| 6,064,769 A | 5/2000 | Nakao et al. | |
| 6,393,150 B1 * | 5/2002 | Lee et al. | 382/176 |
| 6,833,538 B2 | 12/2004 | Sasaki et al. | |
| 6,937,284 B1 | 8/2005 | Singh et al. | |
| 7,253,926 B2 * | 8/2007 | Ohkawa | 358/3.03 |
| 7,305,249 B2 * | 12/2007 | Lo | 455/550.1 |
| 2003/0044068 A1 | 3/2003 | Kagehiro et al. | |
| 2003/0133623 A1 * | 7/2003 | Lee et al. | 382/270 |
| 2003/0137677 A1 * | 7/2003 | Ohkawa | 358/1.2 |
| 2003/0178487 A1 * | 9/2003 | Rogers | 235/454 |
| 2005/0052558 A1 * | 3/2005 | Yamazaki et al. | 348/333.12 |
| 2005/0064898 A1 * | 3/2005 | Chambers et al. | 455/556.1 |
| 2005/0276482 A1 * | 12/2005 | Lai et al. | 382/202 |
| 2006/0044452 A1 | 3/2006 | Hagino | |
| 2007/0142035 A1 * | 6/2007 | Lee | 455/414.1 |

FOREIGN PATENT DOCUMENTS

| | | |
|---|---|---|
| CN | 1147807 | 3/2002 |
| CN | 2587124 | 11/2003 |
| CN | 1147807 | 4/2004 |
| JP | 2000-032111 | 1/2000 |
| KR | 1020030063249 | 7/2003 |
| KR | 1020030094708 A | 12/2003 |
| KR | 1020040018766 A | 3/2004 |
| KR | 1020040023498 | 3/2004 |
| WO | 2004-038476 | 5/2004 |
| WO | 2004/038476 | 5/2004 |

* cited by examiner

*Primary Examiner*—Gregory M Desire
(74) *Attorney, Agent, or Firm*—Lee, Hong, Degerman, Kang & Waimey

(57) ABSTRACT

A document image processing method includes providing a document image, selecting fields, which is to be recognized, from the document image, and performing character recognition process for the selected fields.

11 Claims, 8 Drawing Sheets

METHOD FOR PROCESSING DOCUMENT IMAGE CAPTURED BY CAMERA

CROSS REFERENCE TO RELATED APPLICATIONS

Pursuant to 35 U.S.C. § 119(a), this application claims the benefit of earlier filing date and right of priority to Korean Patent Application Nos. 10-2004-0069320 and 10-2004-0069844, filed on Aug. 31, 2004 and Sep. 2, 2004, respectively, the contents of which are hereby incorporated by reference herein in their entirety.

BACKGROUND OF THE INVENTION

1. Field of the Invention

The present invention relates to a method for recognizing characters on a document image captured by a camera and saving recognized characters. Particularly, the present invention relates to a method for recognizing characters on a name card image captured by a mobile camera phone with an internalized or externalized camera and automatically saving the recognized characters in corresponding fields of a predetermined form such as a telephone directory database.

2. Description of the Related Art

An optical character recognition (OCR) system or a scanner-based character recognition system has been widely used to recognize characters on a document image. However, since these systems are dedicated system for recognizing characters on a document image, massive applications and hardware sources are required to process and recognize the document image. Therefore, it is difficult to simply apply the character recognition method used in the OCR system or scanner based recognition system to a device having a limited process and memory. A mobile camera phone may be designed to recognize the characters. That is, the camera phone is used to take a picture of a small name card, recognize the characters on the captured image, and automatically save the recognized characters in a phone number database. However, since the mobile camera phone has a limited processor and memory, it is difficult to accurately process the image and recognize the characters on the image.

Describing a method for recognizing a name card using the mobile camera phone in more detail, a name card image is first captured by a camera of the mobile camera phone and the characters on the captured card image are recognized by fields using a character recognition algorithm. The recognized characters are displayed by fields such as a name, a telephone number, an e-mail address, and the like. Then, the characters displayed by fields are corrected and edited.

The corrected and edited characters are saved in a predetermined form of a phone number database.

Generally, when a user receives names cards from customers, friends and the like, the users opens a phone number editor of his/her mobile phone and inputs the information on the name card by himself/herself using a keypad of the mobile phone. This is troublesome for the user. Therefore, a mobile camera phone having a character recognizing function has been developed to take a picture of the name card and automatically save the information on the name card in the phone number database. That is, a document/name card image is captured by an internalized or externalized camera of a mobile camera phone and characters on the captured image are recognized according to a character recognition algorithm. The recognized characters are automatically saved in the phone number database.

However, when a relatively large number of characters are existed on image capture by the camera or scanner, since the mobile phone has a limited process and memory source, a relatively long process time is taken even when the recognition process is optimized. Furthermore, when the characters are composed in a variety of languages, the recognition rate may be deteriorated as compared with when they are composed in a single language.

FIG. 1 shows a schematic block diagram of a prior mobile phone with a character recognizing function.

A mobile phone includes a control unit 5, a keypad 1, a display unit 3, a memory unit 9, an audio converting unit 7c, a camera module unit 7b, and a radio circuit unit 7a.

The control unit 5 processes data of a document (name card) image read by the camera module unit 7b, output the processed data to the display unit 3, processes editing commands of the displayed data, which are inputted by a user, and save the data edited by the user in the memory unit 9. The keypad 1 functions as a user interface for selecting and manipulating the function of the mobile phone. The display unit 3 displays a variety of menu screens, a run screen and a result screen. The display unit 3 further displays an interface screen such as a document image data screen, a data editing screen and a edited data storage screen so that the user edits the data and save the edited data. The memory unit 9 is generally comprised of a flash memory, a random access memory, a read only memory. The memory unit 9 saves a real time operating system and software for processing the mobile phone, and information on parameters and states of the software and the operating system and performs the data input/output in accordance with commands of the control unit 5. Particularly, the memory unit 9 saves a phone number database in which the information corresponding to the recognized characters through a mapping process.

The audio converting unit 7c processes voice signal inputted through a microphone by a user and transmits the processed signal to the control unit 5 or outputs the processed signal through a speaker. The camera module unit 7b processes the data of the name card image captured by the camera and transmits the processed data to the control unit 5. The camera may be internalized or externalized in or from the mobile phone. The camera is a digital camera. The radio circuit unit 7a functions to connect to mobile communication network and process the transmission/receive of the signal.

FIG. 2 shows a block diagram of a prior name card recognition engine.

A prior name card recognition engine includes a still image capture block 11, a character-line recognition block 12, and application software 13 for a name card recognition editor.

The still image capture block 11 converts the image captured by a digital camera 10 into a still image. The character line recognition block 12 recognizes the characters on the still image, converts the recognized characters into a character line, and transmits the character line to the application software. The application software 13 performs the name card recognition according to a flowchart depicted in FIG. 3.

A photographing menu is first selected using a keypad 1 (S31) and the name card image photographed by the camera is displayed on the display unit (S32). A name card recognition menu for reading the name card is selected S33. Since the recognized data is not accurate in an initial step, the data cannot be directed transmitted to the database (a personal information managing data base such as a phone number database) saved in the memory unit. Therefore, the name card recognition engine recognizes the name card, coverts the same into the character line, and transmits the character line to the application software. The application software supports the mapping function so that the character line matches with an input form saved in the database.

The recognized name card data and the editing screen is displayed on the display unit so that the user can edits the name card data and performs the mapping process (S34 and S35). The user corrects or deletes the characters when there is an error in the character line. Then, the user selects a character line that he/she wishes to save and saves the selected character line. That is, when the mapping process is completed, the user selects a menu "save in a personal information box" to save the recognized character information of the photographed name card image in the memory unit (S36).

FIGS. 4 and 5 show an example of a name card recognition process.

FIG. 4 is an editing screen by which the user can corrects or deletes the wrong characters when the user finds the wrong characters while watching the screens provided in the steps S34 and S35. In the editing screen, the user moves a cursor to a wrong characters "DEL" 40 to change the same to a correct characters "TEL". After the editing is finished, the user selects only character lines that he/she wishes to save in the database and saves the same in the memory unit. For example, as shown in FIG. 5, when a job title of the name card is "Master Researcher," the line "Master Researcher" 50 is blocked and a field "title" 61 is selected in a menu list 60. Then, the mapping process is performed to save the "Master Researcher" that is a recognition result in a title field of the database.

In order to improve the recognition rate of the mobile phone, a clear, correct document image data (a photographed name card image data) must be provided to an input device of the character recognition system. In addition, the most efficient recognition can be realized while minimizing the load of the limited sources such as the processor and memory of the mobile phone.

In order to recognize the characters on the name card image captured by the camera, the name card image is first binary-coded and a field required by the user is selected from the binary-coded image and saved in the memory unit. At this select, since the binary-coding process is performed even for an unnecessary portion of the name card image, the recognition efficiency is deteriorated. Particularly, since the character recognition and the field selection are performed after the binary-coding process for all of the name card image is performed, the manipulation frequency of the mobile phone is increased, thereby deteriorating the user-convenience.

SUMMARY OF THE INVENTION

Accordingly, the present invention is directed to a document image processing method, which substantially obviate one or more problems due to limitations and disadvantages of the related art.

It is an object of the present invention to provide a document image processing method that can improve recognition efficiency and speed and omit an unnecessary recognition process by selecting a field, for which a character recognition process will be performed, from a document image captured by a camera before the character recognition process is performed and performing the character recognition process only for the selected field.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly selected out in the written description and claims hereof as well as the appended drawings.

To achieve these objects and other advantages and in accordance with the purpose of the invention, as embodied and broadly described herein, there is provided a document image processing method, comprising: providing a document image; selecting fields, which is to be recognized, from the document image; and performing character recognition process for the selected fields.

According to another aspect of the present invention, there is provided a document image processing method of a mobile phone, comprising: selecting fields, which is to be character-recognized, from a document image captured by a camera; performing a character-recognition process for the selected fields; and saving recognized character data.

According to still another aspect of the present invention, there is provided a document image processing method of a mobile phone, comprising: extracting fields from a document image; selecting fields, which is to be character-recognized, from the extracted fields; designating different binary-coding methods for the selected fields; performing the character-recognition process for the selected fields according to the designated binary-coding methods; and editing and storing recognized data.

The document image is a name card image photographed by a camera associated with the mobile phone and the fields are character lines written on the name card.

The selected fields are separated into different groups and different binary coding methods are applied for the two groups.

The different binary-coding methods are designated for the selected fields in advance or selected by a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
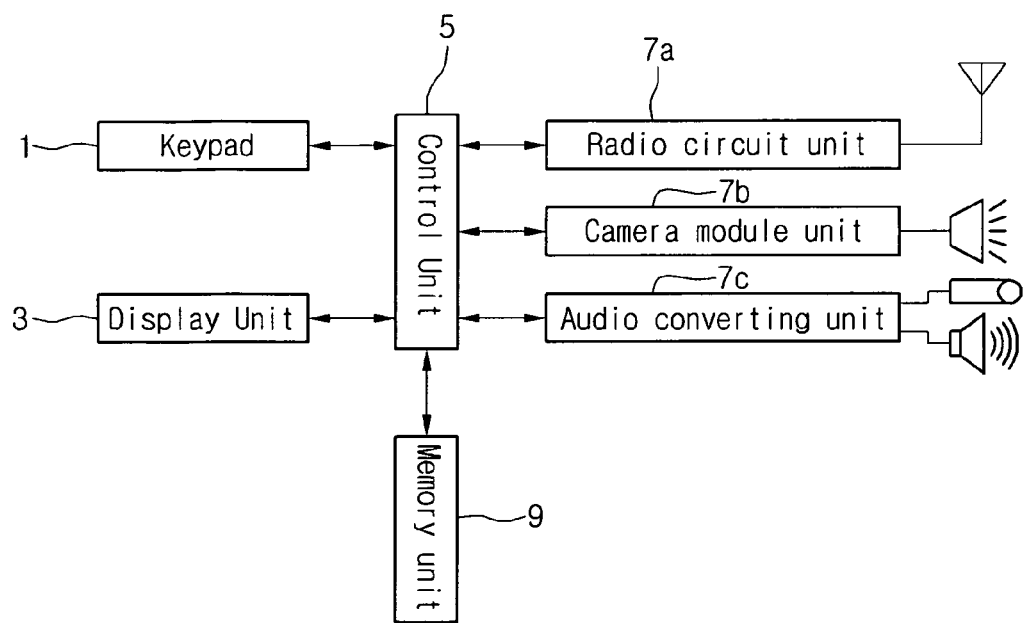
FIG. 1 is a schematic block diagram of a prior mobile phone with a character recognizing function.
Figure 2:
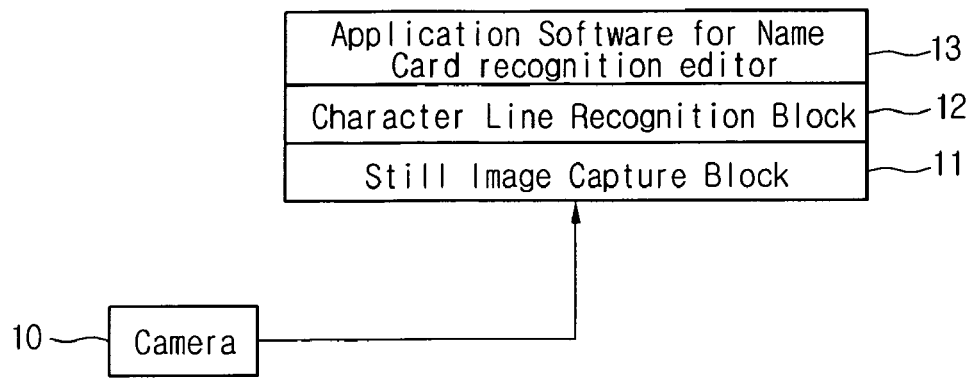
FIG. 2 is a schematic block diagram of a prior name card recognition engine.
Figure 3:
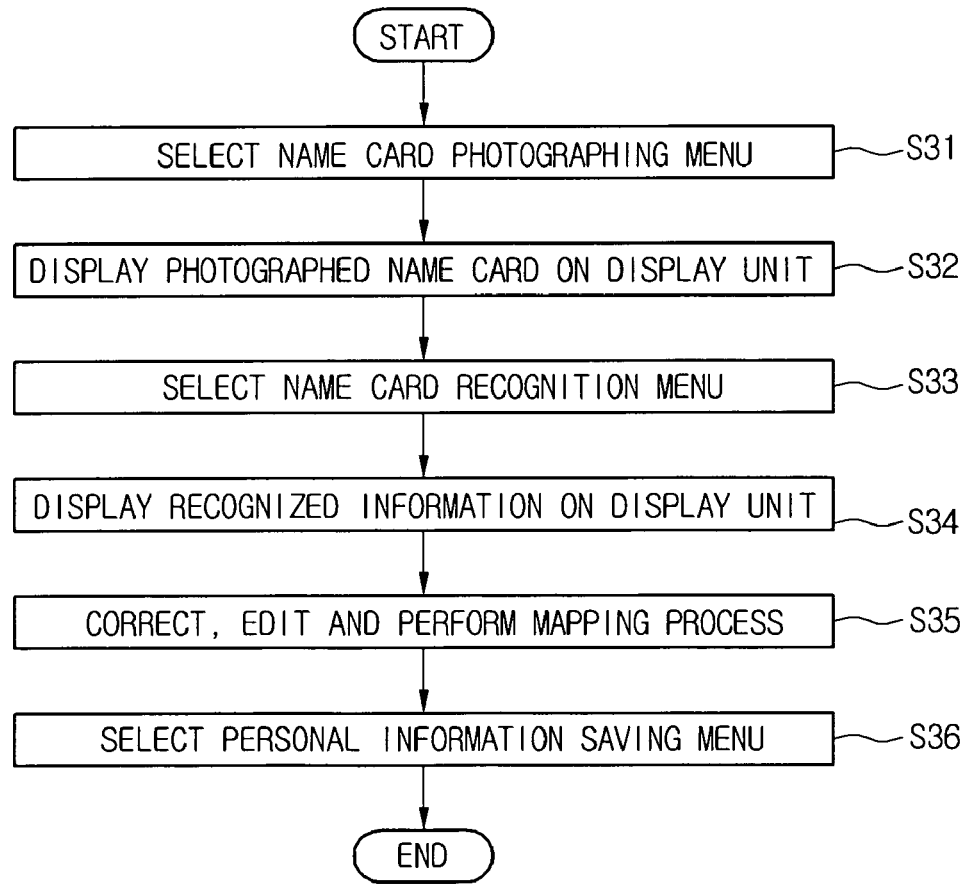
FIG. 3 is a flowchart illustrating a prior name card recognition process.
Figure 4:
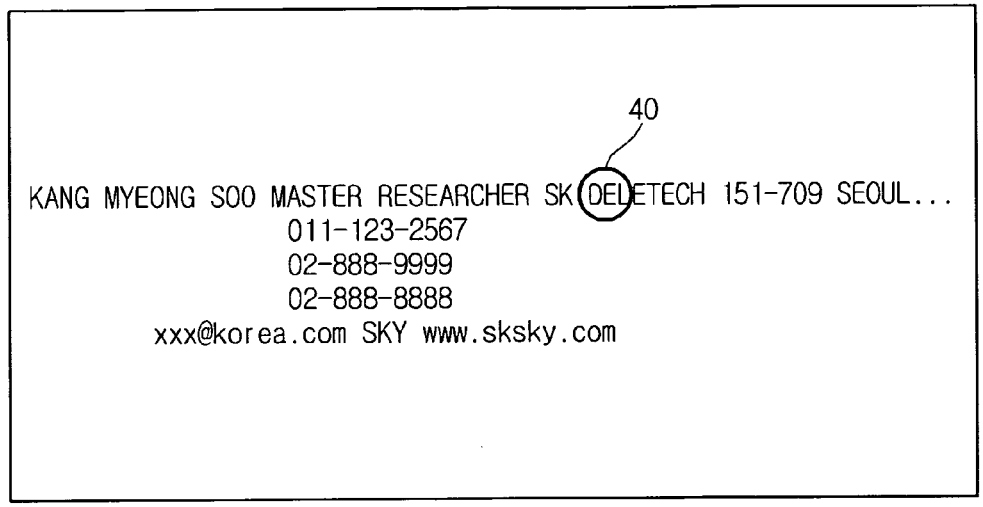
FIGS. 4 and 5 are views of an example of a name card recognition process depicted in FIG. 3.
Figure 5:
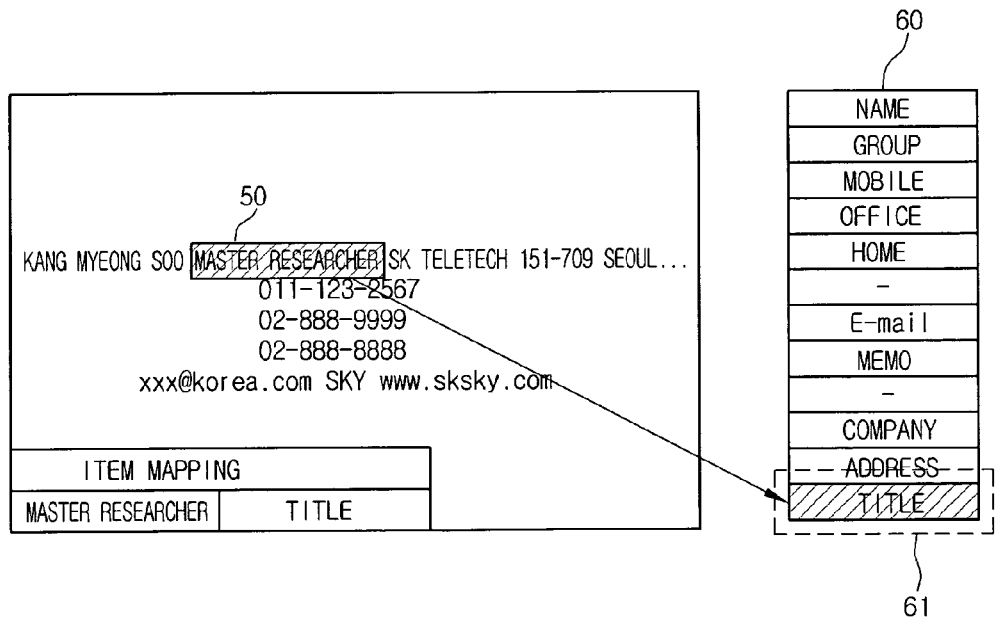
Figure 6:
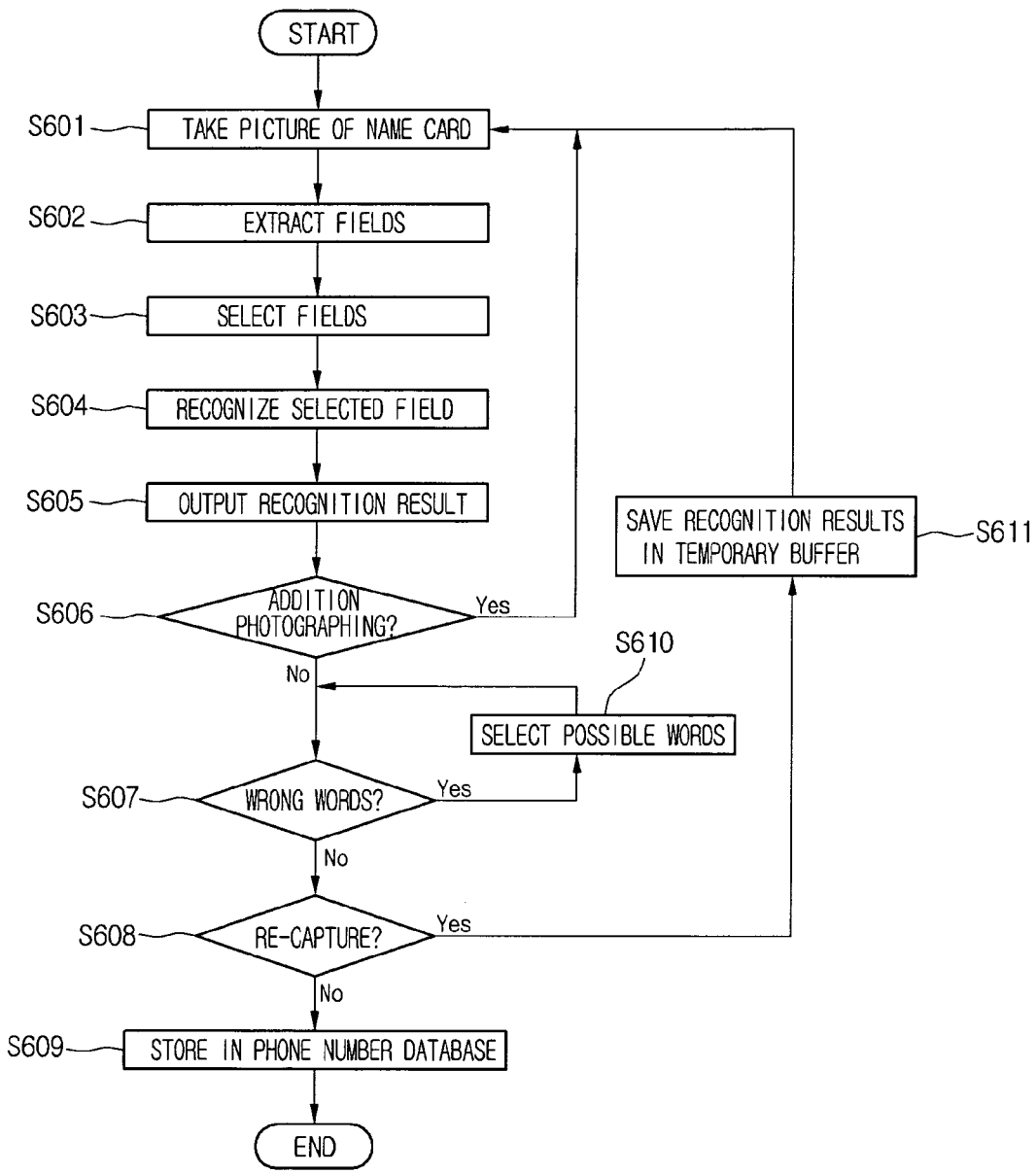
FIG. 6 is a flowchart illustrating a name card recognition process according to an embodiment of the present invention.

FIG. 6 shows a flowchart illustrating a name card recognition process according to an embodiment of the present invention.

A user first take a picture of a name card using a camera associated with a mobile phone. At this select, it is assumed that a size of the name card is 176×144 in a preview state (S601). The name card image captured by the camera may be a portion of the name card or a whole portion of the name card. Fields are extracted from the name card image (S602). Then, the user selects fields, for which he/she wishes to perform a character recognition process, from the extracted fields (S603). The recognition process is performed only for the selected fields (S604). By doing this, an unnecessary recognition process can be omitted. At this select, one of high-speed and precise binary-coding methods is performed according to importance of the selected fields and difficulty in recognition. That is, the binary-coding method may be varied according to the fields.

The high-speed binary-coding method is processed in a state where a size of the photographed image containing the selected fields is reduced. That is, by reducing the photographed image, the amount of calculation for the selected fields can be reduced in the binary-coding process. On the contrary, the precise binary-coding process method performs the binary coding for the selected fields without reducing the size of the photographed image. Therefore, although the high-speed binary-coding method can quickly perform the binary-coding process, the recognition rate may be reduced. Although the precise binary-coding method can slowly perform the binary-coding process, the recognition rate may be increased.

For the characters such as numbers, names and the like that are easy to recognize, the high-speed binary-coding method may be applied. However, for the characters such as symbols that are not easy to recognize, the precise binary-coding method may be applied. One of the high-speed and precise binary-coding methods may be designated for each field in advance. Alternatively, the user can select one of the high-speed and precise binary-coding methods for each field. For example, the important fields are designated with the precise binary-coding method in advance while the relatively less important fields are designated with the high-speed binary-coding method. Alternatively, the user designates one of the high-speed and precise binary-coding methods for each field.

When the selected fields are recognized by the recognition engine, the recognition results are displayed on the screen of the mobile phone (S605). Next, it is determined if there is a need to further take a picture of the name card for additional fields that is to be added (S606). When there is a need to further take a picture, the above-described processes are repeated. This is generally required when the fields necessary for the user are existed on both surfaces of the name card. When it is determined that there is no need to further take a picture, it is determined if there are wrong characters in the recognized field that are selected in advance. When it is determined there are wrong characters, the user corrects the wrong characters (S607 and S610).

When there is no wrong character, it is determined if there is a need to perform a re-capture for the name card. When it is determined that there is a need to perform the re-capture, the recognition results of the image that is early taken is saved in a temporary buffer (S608 and S611). The re-capture may be performed when the user determines that the image early taken is not the desired image. However, even when the re-capture is performed, the recognition results for the image early taken are saved in the temporary buffer. After the re-capture is performed, the above-described processes such as the field extraction, the field selection and the like are repeated to obtain a new recognition image (S611, S601 and S602).

Lastly, the recognized character data are stored in a personal information-managing database such as a phone number database in response to proper fields (S609).

As described above, when the recognized image obtained by performing one of the high-speed and precise binary-coding process for the selected fields, the addition photographing process, the wrong character determining process, the retaking process are selectively performed before the recognition results are saved in the database. The recognition results may be saved in the form of a phone book so that the user can easily perform the data search, data edit, SMS transmission, phone call, group designation and the like.

Figure 7:
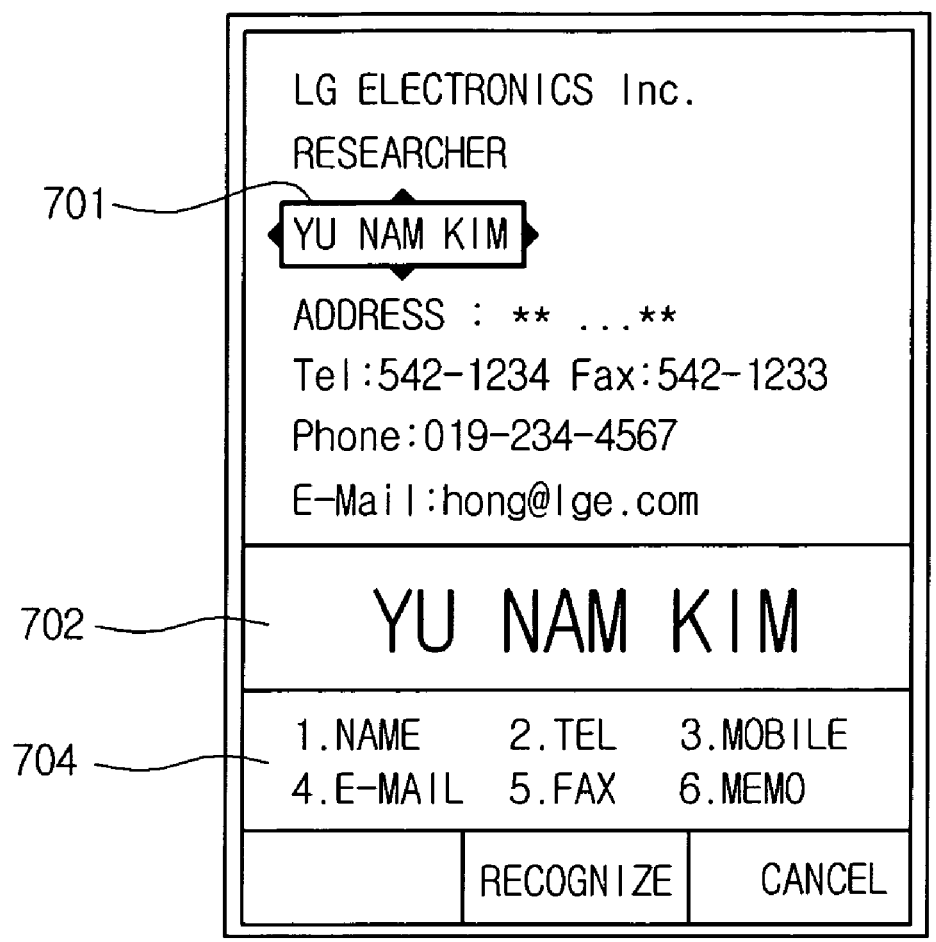
FIGS. 7 and 8 a view illustrating a process for selecting a field in a name card recognition process according to an embodiment of the present invention.
Figure 8:
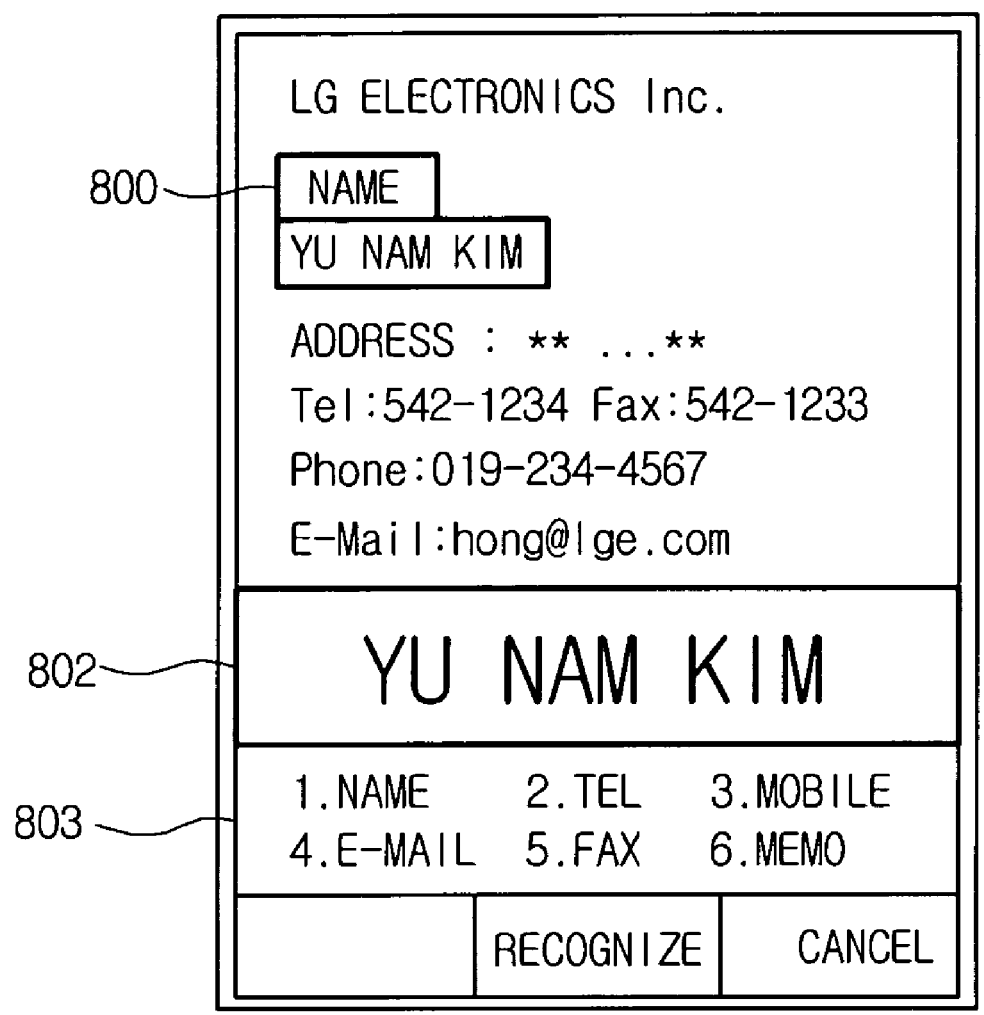

FIGS. 7 and 8 are views illustrating a designation of the fields in the name card recognition process according to an embodiment of the present invention.

As shown in FIG. 7, the name card image captured by the camera and camera sensor is displayed on the screen of the mobile phone. For example, an image 701, an enlarged window 702, and a selection section 704 having a variety of selection fields are displayed on the screen. The selection section 704 includes a name, a phone number field, a mobile phone number field, an email address field, a facsimile number field, and a memo field to which a title, an address and the like can be added. When the name card is photographed and displayed, as shown in FIG. 8, the user extracts desired fields from the name card image. When the "name YU NAM KIM" is selected by moving the cursor 800, the "YU NAM KIM" is enlarged and displayed on the enlarged window 803. The user identifies one of the fields, which corresponds to the selected field, and selects the identified field. In the drawing, since the cursor 800 selects the "YU NAM KIM" which is the name, the user selects the number "1" so that the name field "1" recognizes the name "YU NAM KIM" and saves the same.

Figure 9:
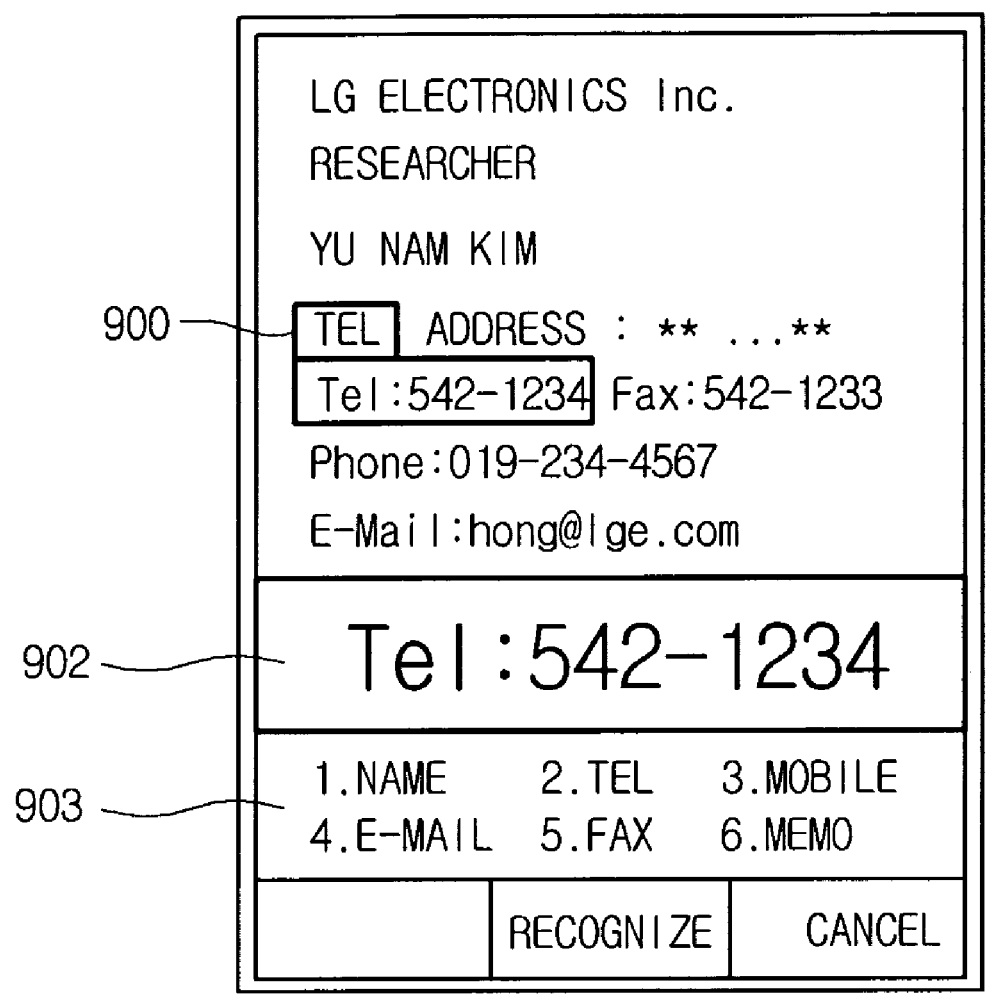
FIG. 9 is a view illustrating a process for selecting a plurality of field in order in a name card recognition process according to an embodiment of the present invention.

FIG. 9 illustrates a process for selecting a plurality of field in order in a name card recognition process according to an embodiment of the present invention.

As described in FIG. 9, when the cursor 900 selects the telephone number, the telephone number is enlarged and displayed on the enlarged window 902 and the user selects the telephone number field in the selection section 903 by selecting the number "2" so that the telephone number field "2" recognizes the telephone number and saves the same.

Figure 10:
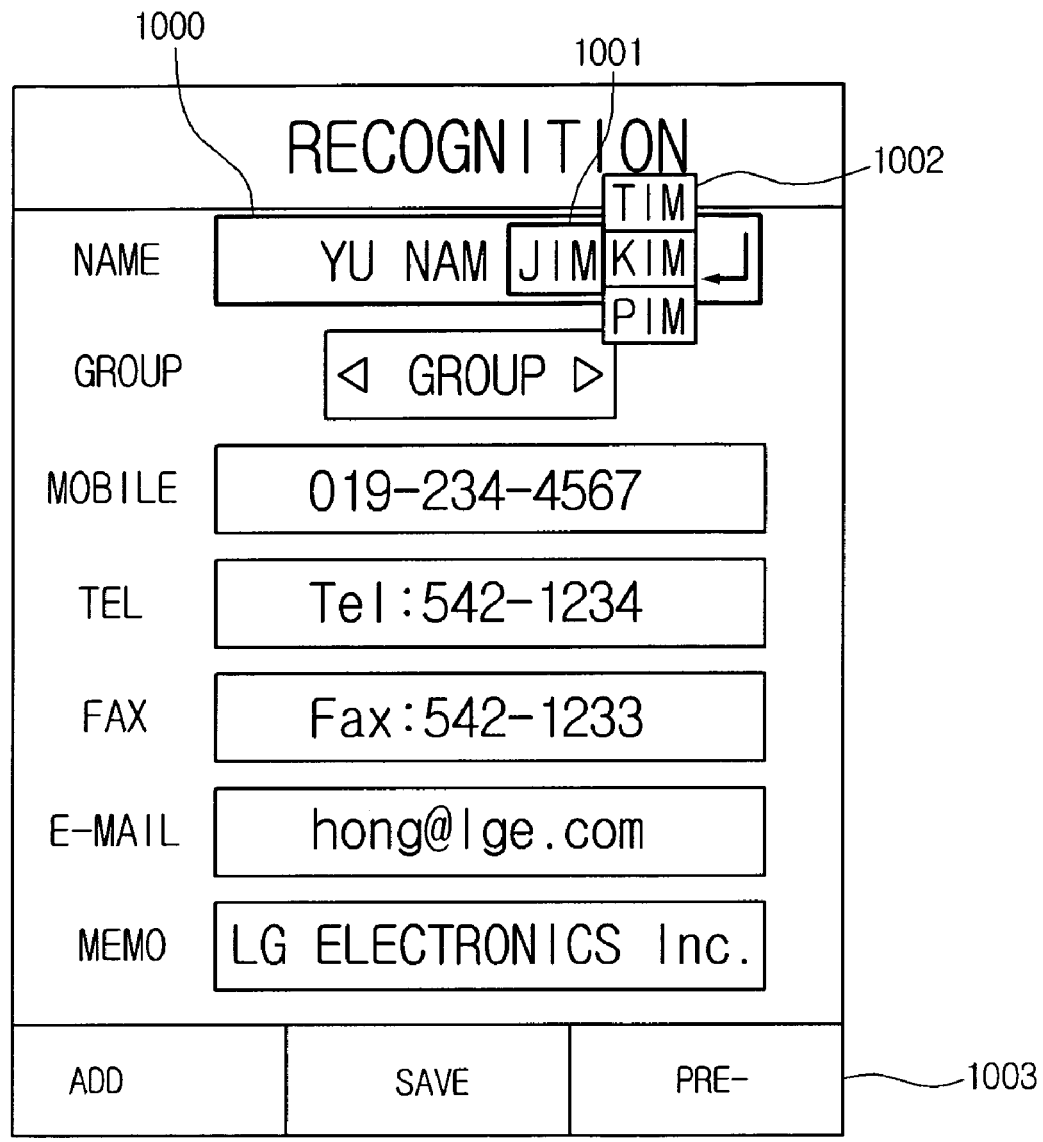
FIG. 10 is a view illustrating a recognition result of characters written on a name card according to an embodiment of the present invention.

FIG. 10 illustrates a recognition result of characters written on a name card according to an embodiment of the present invention.

As shown in the drawing, the fields are selected and the recognition is realized for the selected field. That is, the name, telephone number, mobile phone number, facsimile number, and email address are recognized in the corresponding fields. In addition, a company name is recognized in the memo field. The recognized image is saved or it is determined if there is a need to further take a picture of the name card or to reselect the card image to add addition recognition fields.

In the present invention, a spelling check function may be provided to correct the fields having a recognition error. In the drawing, possible words 1002 that can replace a wrong spelling "JIM" 1001. When the user selects a word "KIM," the wrong word "JIM" is changed into the correct word "KIM."

The recognition results are saved in the data storage unit.

According to the present invention, since the binary-coding process is performed only for the selected fields, the recognition speed and rate can be increased and the number of user's button manipulation can be reduced. Furthermore, since the spelling check function is provided for the recognition results, the recognition errors can be easily corrected.

As described above, since the recognition process is performed only for the characters, for which the user wishes to recognize, the recognition efficiency and the user's convenience can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A document image processing method performed by a mobile phone, the method comprising:
    capturing an image from a document using a camera of the mobile phone;
    selecting fields, which are to be character recognized, from the captured image;
    performing character recognition process on the selected fields;
    displaying the recognized character on a display unit; and
    proposing alternative words to a user for the user to correct a misspelled word by selecting one of the alternative words.

2. The document image processing method according to claim 1, wherein the document is a name card and the fields are character lines written on the name card.

3. The document image processing method according to claim 1, wherein the recognized fields are saved by corresponding fields by a personal information-managing database.

4. The document image processing method according to claim 1, further comprising correcting and editing the recognized fields when an error is detected.

5. The document image processing method according to claim 1, further comprising:
    capturing a plurality of images from a single document;
    performing character recognition process on selected fields of the plurality of images; and
    categorizing the character recognized selected fields into a result from the single document.

6. A document image processing method performed by a mobile phone, the method comprising:
    capturing an image from a document using a camera of the mobile phone;
    selecting fields, which are to be character recognized, from the captured image;
    mapping one of the selected fields to one of predetermined fields;
    performing a character-recognition process using the mobile phone, on the selected fields; and
    providing a user a group field for categorizing the recognized field.

7. The document image processing method according to claim 6, wherein the document is a name card and the fields are character lines written on the name card.

8. The document image processing method according to claim 6, wherein the recognized fields are saved by corresponding fields by a personal information-managing database.

9. The document image processing method according to claim 6, further comprising correcting and editing the recognized fields when there is an error.

10. The document image processing method according to claim 6, further comprising:
    capturing a plurality of images from a single document;
    performing character recognition process on selected fields of the plurality of images; and
    categorizing the character recognized selected fields into a result from the single document.

11. A document image processing method performed by a mobile phone, the method comprising:
    capturing an image from a document using a camera of the mobile phone;
    selecting fields, which are to be character recognized, from the captured image;
    mapping one of the selected fields to one of predetermined fields, wherein the mapping is performed by a user's selecting one of the selected field and selecting a number key which is associated with one of the predetermined fields; and
    performing a character-recognition process using the mobile phone, on the selected fields.

* * * * *